(12) United States Patent
Robert Jose et al.

(10) Patent No.: US 11,893,013 B2
(45) Date of Patent: *Feb. 6, 2024

(54) METHOD AND APPARATUS FOR DETERMINING AND PRESENTING ANSWERS TO CONTENT-RELATED QUESTIONS

(71) Applicant: Rovi Guides, Inc., San Jose, CA (US)

(72) Inventors: Jeffry Copps Robert Jose, Tamil Nadu (IN); Ankur Anil Aher, Maharashtra (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,658

(22) Filed: Sep. 8, 2022

(65) Prior Publication Data

US 2023/0145903 A1     May 11, 2023

Related U.S. Application Data

(63) Continuation of application No. 17/369,848, filed on Jul. 7, 2021, now Pat. No. 11,468,055, which is a continuation of application No. 16/704,528, filed on Dec. 5, 2019, now Pat. No. 11,086,862.

(51) Int. Cl.
*G06F 16/2452* (2019.01)
*G06N 20/00* (2019.01)
*G06F 16/248* (2019.01)
*G06F 3/048* (2013.01)

(52) U.S. Cl.
CPC ...... *G06F 16/24522* (2019.01); *G06F 16/248* (2019.01); *G06N 20/00* (2019.01); *G06F 3/048* (2013.01)

(58) Field of Classification Search
CPC .. G06F 3/048; G06F 16/24522; G06F 16/248; G06N 20/00
See application file for complete search history.

(56) References Cited

U.S. PATENT DOCUMENTS

| | | | |
|---|---|---|---|
| 7,984,472 B2 * | 7/2011 | Incentis Carro | G11B 27/322 725/112 |
| 8,842,085 B1 | 9/2014 | Goodspeed et al. | |
| 8,863,180 B1 | 10/2014 | Devillier et al. | |
| 9,026,916 B2 * | 5/2015 | Kanjirathinkal | G06Q 50/01 715/738 |
| 9,026,934 B1 | 5/2015 | Shah | |
| 9,161,066 B1 | 10/2015 | Oztaskent et al. | |
| 10,521,188 B1 | 12/2019 | Christie et al. | |

(Continued)

FOREIGN PATENT DOCUMENTS

WO     2018097835 A1     5/2018

OTHER PUBLICATIONS

International Search Report and Written Opinion of PCT/US2020/063091 dated Feb. 17, 2021 (14 pages).

*Primary Examiner* — Eric J. Bycer
(74) *Attorney, Agent, or Firm* — Haley Guiliano LLP

(57) ABSTRACT

Systems and methods for determining the answers to user queries regarding content, and presenting options for the user to view the answers. Searches are conducted to determine the answer to a query and, once the answer is found, various options are presented to the user, allowing the user the choice to view the answer in multiple different ways.

20 Claims, 10 Drawing Sheets

(56) References Cited

U.S. PATENT DOCUMENTS

| | | |
|---|---|---|
| 10,966,000 B1 | 3/2021 | Robert Jose et al. |
| 11,086,862 B2 | 8/2021 | Robert Jose et al. |
| 11,468,055 B2 | 10/2022 | Robert Jose et al. |
| 2002/0023144 A1* | 2/2002 | Linyard ............... G06F 9/453 709/219 |
| 2002/0087520 A1* | 7/2002 | Meyers ............... G06F 16/335 |
| 2006/0075451 A1 | 4/2006 | Gupta et al. |
| 2007/0022109 A1 | 1/2007 | Imielinski et al. |
| 2007/0124752 A1 | 5/2007 | Sakai |
| 2007/0157237 A1 | 7/2007 | Cordray et al. |
| 2007/0157249 A1 | 7/2007 | Cordray et al. |
| 2008/0138034 A1 | 6/2008 | Hiroi et al. |
| 2008/0207316 A1 | 8/2008 | Burnett et al. |
| 2009/0037252 A1 | 2/2009 | Joyce |
| 2009/0208180 A1 | 8/2009 | Ashby et al. |
| 2011/0261030 A1 | 10/2011 | Bullock |
| 2012/0072941 A1 | 3/2012 | Thornberry et al. |
| 2012/0136825 A1* | 5/2012 | Harris ............... G06F 16/438 707/E17.001 |
| 2013/0024879 A1 | 1/2013 | Bruich et al. |
| 2013/0151954 A1 | 6/2013 | Ierullo |
| 2013/0294755 A1 | 11/2013 | Arme et al. |
| 2014/0010244 A1 | 1/2014 | Bui et al. |
| 2014/0101706 A1 | 4/2014 | Kardatzke |
| 2016/0035234 A1 | 2/2016 | Choi et al. |
| 2016/0191999 A1 | 6/2016 | Friedrich |
| 2016/0261915 A1 | 9/2016 | Niebres et al. |
| 2017/0311040 A1* | 10/2017 | Barnes ............... H04N 21/4334 |
| 2017/0316085 A1 | 11/2017 | Gupta et al. |
| 2018/0014077 A1 | 1/2018 | Hou et al. |
| 2018/0032513 A1 | 2/2018 | Venkataraman et al. |
| 2018/0114076 A1 | 4/2018 | Miller et al. |
| 2018/0152758 A1 | 5/2018 | Miller |
| 2018/0152759 A1 | 5/2018 | Miller |
| 2019/0012373 A1 | 1/2019 | Malik et al. |
| 2019/0324612 A1 | 10/2019 | Du et al. |
| 2019/0349619 A1 | 11/2019 | Hou |
| 2019/0354630 A1* | 11/2019 | Guo ............... G10L 15/08 |
| 2020/0286481 A1* | 9/2020 | Barton ............... G06F 16/90332 |
| 2020/0304851 A1 | 9/2020 | Hou |
| 2021/0173836 A1 | 6/2021 | Robert Jose et al. |
| 2021/0342349 A1 | 11/2021 | Robert Jose et al. |

\* cited by examiner

METHOD AND APPARATUS FOR DETERMINING AND PRESENTING ANSWERS TO CONTENT-RELATED QUESTIONS

CROSS-REFERENCE TO RELATED APPLICATIONS

This application is a continuation of U.S. patent application Ser. No. 17/369,848 (now U.S. Pat. No. 11,468,055), filed Jul. 7, 2021, which is a continuation of U.S. patent application Ser. No. 16/704,528 (now U.S. Pat. No. 11,086,862), filed Dec. 5, 2019, the disclosures of which are hereby incorporated by reference herein in their entireties.

BACKGROUND

Embodiments of the disclosure relate generally to content display systems. More specifically, embodiments of the disclosure relate to systems for determining and presenting answers to content-related questions.

SUMMARY

Some contemporary electronic content display systems not only display content for users, but also include functionality that allows users to pose, and receive answers to, various questions. This functionality allows users to speak or type queries into the display system, and receive answers. Thus, for instance, users can request other titles of actors in the content they are currently watching, can ask the system for the names of actors or actresses in a particular episode of content, or the like.

Such systems, while useful, are not without their drawbacks, though. Systems equipped with such functionality do not effectively answer many types of questions. In particular, such systems often have trouble handling queries for which they cannot readily find the answer, such as when the answer to a query does not exist. User-friendly methods of handling such queries are still desired.

Accordingly, to overcome the lack of flexibility in display systems for handling answers to queries, systems and methods are described herein for a computer-based process that determines the meaning of entered queries, searches for their answer, and if an answer exists, presents users options to determine the answer. Such options include an option to view the content in which the question is answered, an option to view the content at a later time, or an option to simply see or hear the answer.

In one embodiment, a query is first received from a user. The query may be any type of query, such as a voice query or a text query. It is then determined whether this query represents a question presented in an episode that already exists, but has not yet been viewed by that user. Thus, for example, a user may be catching up on a series that has already been released but that he or she has not yet completed. The user may have viewed part of the series, and pose a question regarding a later episode in that series. Upon determining that the user's query represents a question with an answer presented in an existing later episode that the user has not yet viewed, the system may determine the episode that answers the user's question, and present the user with options for learning the answer. For instance, the system may present the user an option to view the content in which the question is answered, an option to view the content at a later time, or an option to simply see or hear the answer. Any one or more of these options may be presented.

To answer the question posed by the user, any sources may be analyzed. For instance, any electronic record may be searched. That is, any source accessible by an electronic search may be retrieved and analyzed to determine the answer. This may include any episode of the series or any associated metadata, any electronically searchable document, file, web page, or the like.

Once retrieved, any such electronic records may be analyzed to determine their meaning, and more specifically to determine whether they contain an answer to the user's question. The system may accomplish this by determining a natural language understanding of the retrieved records.

Some questions may not have an existing answer. For example, a question posed may not be answered until a later, yet to be aired episode of the content reveals the answer. In these and other cases, the question may be stored at least until the answer is found. Such storage can be performed in any manner. For instance, keywords of the question or the user's query may be determined and stored.

As the user presumably does not know the answer to his or her question when it is posed, records that contain an answer to the question may be deemed spoilers that the user may not wish to view until he or she has viewed the corresponding episode of the content. Electronic records that have been deemed to contain the answer to a stored question may thus be identified or labeled as spoiler records, and kept from the user at least until the episode of content containing the answer has been viewed, the user views the answer, or the like.

Translating the query into a question, or determining the meaning of the user's query, may be accomplished in any manner. As one example, a machine learning method may be employed to determine both whether the query poses a question, and if so, the meaning of the user's query. Any machine learning method may be employed to accomplish either of these determinations, such as a classification method in which a query may be classified as a question, and/or classified as having a particular meaning. Any classification method or model may be employed, such as any one or more of a random forest classifier, a support vector machine, a naïve Bayes classifier, a conditional random field classifier, a hidden Markov model, a recurrent neural network, or a convolutional neural network.

In another embodiment, users may submit queries asking questions that the latest content has not yet answered. In such an embodiment, a received query is processed to determine whether it represents a question having an answer not yet revealed in the content, e.g., whether the answer does not yet exist as of the latest episode of the content. Upon determining that the answer to the question has not yet been revealed in the content, an indicator of the query may be stored and used to initiate electronic searches for the answer. Searches may be conducted until the answer is found, at which point various options for viewing the answer may be presented to the user. As in previous embodiments, users may be presented an option to view the content in which the question is answered, an option to view the content at a later time, or an option to simply see or hear the answer. Any one or more of these options may be presented.

Also as in previous embodiments, records that contain the answer to the question may be deemed spoilers that the user may not wish to view until he or she has viewed the corresponding episode of the content. Electronic records that have been deemed to contain the answer to the stored question may thus be identified or labeled as spoiler records, and kept from the user at least until the episode of content containing the answer has been viewed, the user views the answer, or the like. Information associated with the answer may also be determined from the records, such as episode and/or scene numbers in which the answer arises. This determined information may be stored along with the query indicator, for presentation to the user as desired.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for determining the answers to user queries regarding content, and presenting options for the user to view the answers. Searches are conducted to determine the answer to a query and, once the answer is found, various options are presented to the user, allowing the user the choice to view the answer in multiple different ways.

Figure 1:
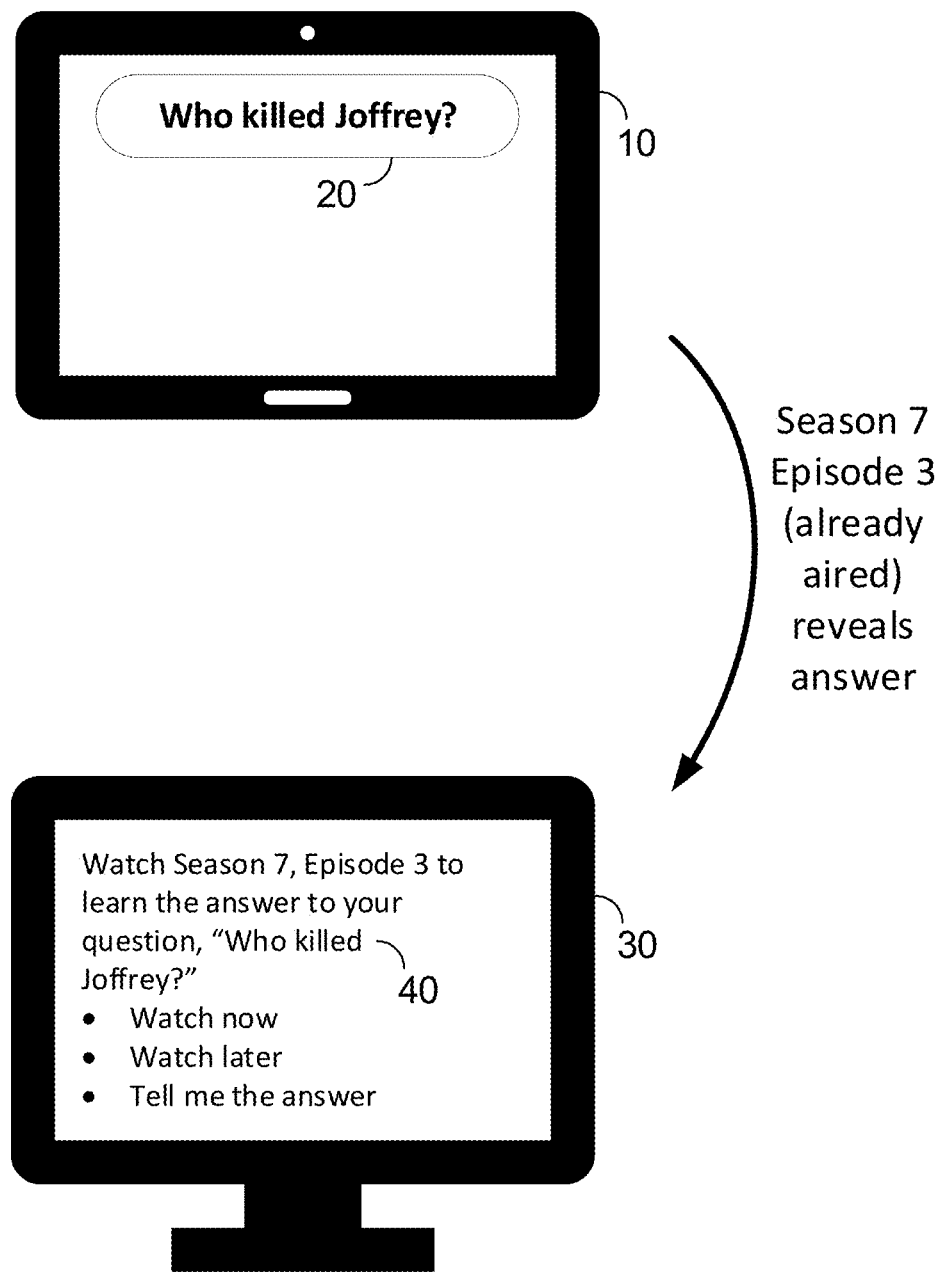
FIG. 1 illustrates exemplary operation of a system for presenting answers to content-related questions, in accordance with embodiments of the disclosure.

FIG. 1 illustrates exemplary operation of a system for presenting answers to content-related questions, in accordance with embodiments of the disclosure. Here, a user may watch episodes of content on his or her content display device 10. During or after viewing content, the user may enter a query into an electronic interface 20, such as a query as to who killed a particular character in the content. In this example, the answer to the user's question has already been revealed in a previously-aired episode. That is, the answer already exists. Accordingly, the answer, i.e., the identity of the episode in which the answer is presented, is retrieved and options for viewing the answer 40 are presented on display 30. The options include an option to immediately watch the episode containing the answer to the query, an option to watch the episode at a later time, and an option to simply have the answer presented, such as in text form displayed on display 30.

Figure 2:
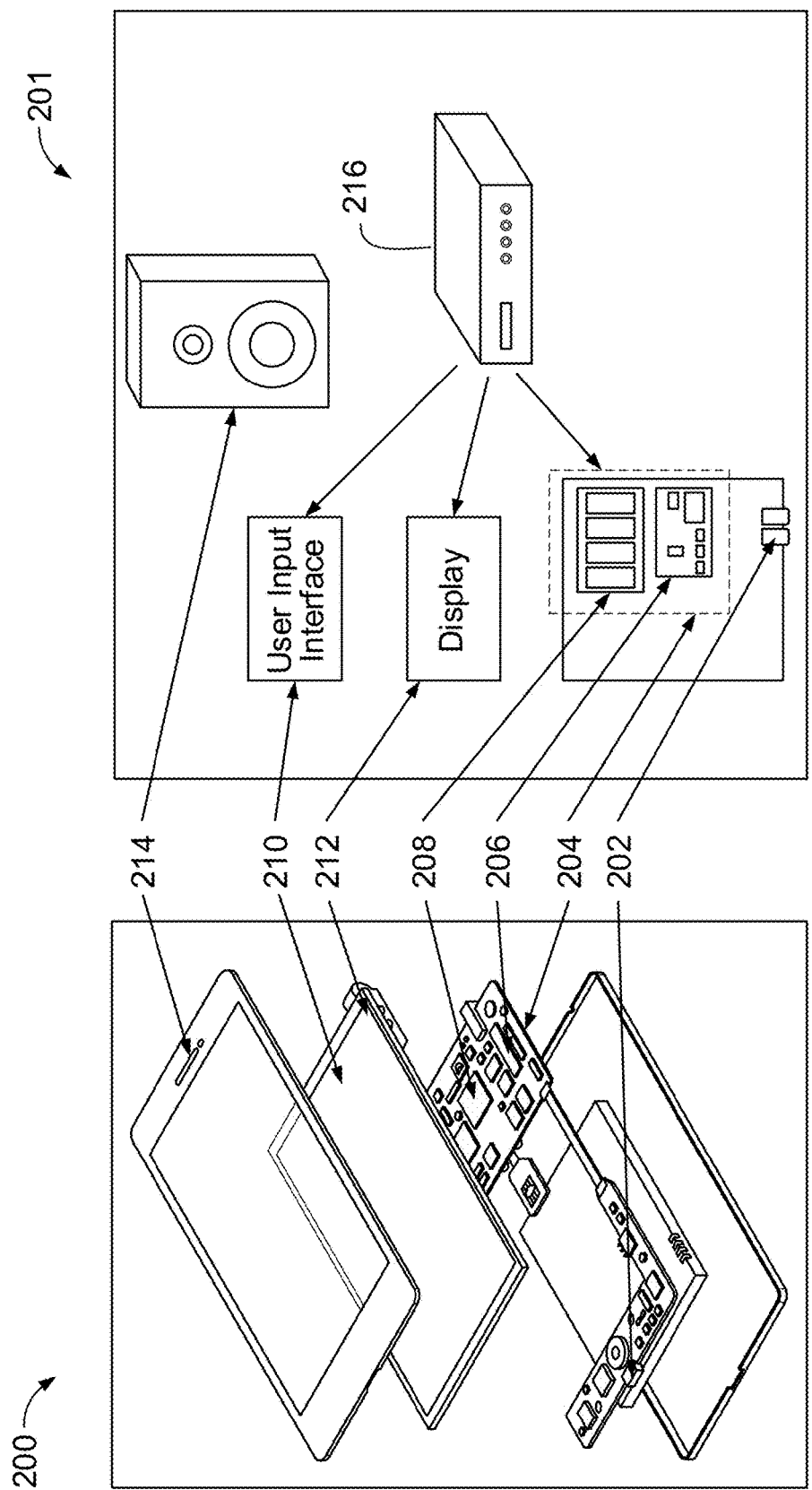
FIG. 2 is a block diagram of an illustrative user equipment device in accordance with embodiments of the disclosure.

FIG. 2 shows generalized embodiments of illustrative user equipment device 200 that may be used in answering content-related questions according to embodiments of the disclosure. Each display 10, 30 of FIG. 1 may be a user equipment device 200. As one example, user equipment device 200 may be a smartphone device or a remote control. In another example, user equipment system 201 may be a user television equipment system. User television equipment system 201 may include a set-top box 216. Set-top box 216 may be communicatively connected to speaker 214 and display 212. In some embodiments, display 212 may be a television display or a computer display. In some embodiments, set top box 216 may be communicatively connected to user interface input 210. In some embodiments, user interface input 210 may be a remote-control device. Set-top box 216 may include one or more circuit boards. In some embodiments, the circuit boards may include processing circuitry, control circuitry, and storage (e.g., RAM, ROM, hard disk, removable disk, etc.). In some embodiments, circuit boards may include an input/output path. More specific implementations of user equipment devices are discussed below in connection with FIGS. 3 and 4.

Each one of user equipment device 200 and user equipment system 201 may receive content and data via input/output (hereinafter "I/O") path 202. I/O path 202 may provide content (e.g., broadcast programming, on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below). I/O functions may be provided by one or more of these communications paths but are shown as a single path in FIG. 2 to avoid overcomplicating the drawing.

Control circuitry 204 may be based on any suitable processing circuitry such as processing circuitry 206. As referred to herein, processing circuitry should be understood to mean circuitry based on one or more microprocessors, microcontrollers, digital signal processors, programmable logic devices, field-programmable gate arrays (FPGAs), application-specific, integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel® Core™ i7 processors) or multiple different processors (e.g., an Intel® Core™ i5 processor and an Intel® Core™ i7 processor). In some embodiments, control circuitry 204 executes instructions for an application program stored in memory (e.g., storage 208). Specifically, control circuitry 204 may be instructed by the application to perform the functions discussed above and below. For example, the application may provide instructions to control circuitry 204 to generate a content curation interface. In some implementations, any action performed by control circuitry 204 may be based on instructions received from the interface.

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content described herein as well as media guidance data described above. Nonvolatile memory may also be used (e.g., to launch a boot-up routine and other instructions). Cloud-based storage, described in relation to FIG. 4, may be used to supplement storage 208 or instead of storage 208.

A user may send instructions to control circuitry 204 using user input interface 210. User input interface 210 may be any suitable user interface, such as a remote control, mouse, trackball, keypad, keyboard, touchscreen, touchpad, stylus input, joystick, voice recognition interface, or other user input interfaces. Display 212 may be provided as a stand-alone device or integrated with other elements of each one of user equipment device 200 and user equipment system 201. For example, display 212 may be a touchscreen or touch-sensitive display. In such circumstances, user input interface 210 may be integrated with or combined with display 212. Display 212 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

The answer determination and presentation functions described above may be implemented as a separate application program, or as a part of another application such as an electronic program guide or other content display application. The answer determination and presentation functions and their application(s) may be implemented using any suitable architecture. For example, it may be a stand-alone application wholly implemented on each one of user equipment device 200 and user equipment system 201. In such an approach, instructions of the application are stored locally (e.g., in storage 208), and data for use by the application is downloaded on a periodic basis (e.g., from an out-of-band feed, from an Internet resource, or using another suitable approach). Control circuitry 204 may retrieve instructions of the application from storage 208 and process the instructions to generate any of the displays discussed herein. Based on the processed instructions, control circuitry 204 may determine what action to perform when input is received from input interface 210. For example, movement of a cursor on a display up/down may be indicated by the processed instructions when input interface 210 indicates that an up/down button was selected.

Figure 3:
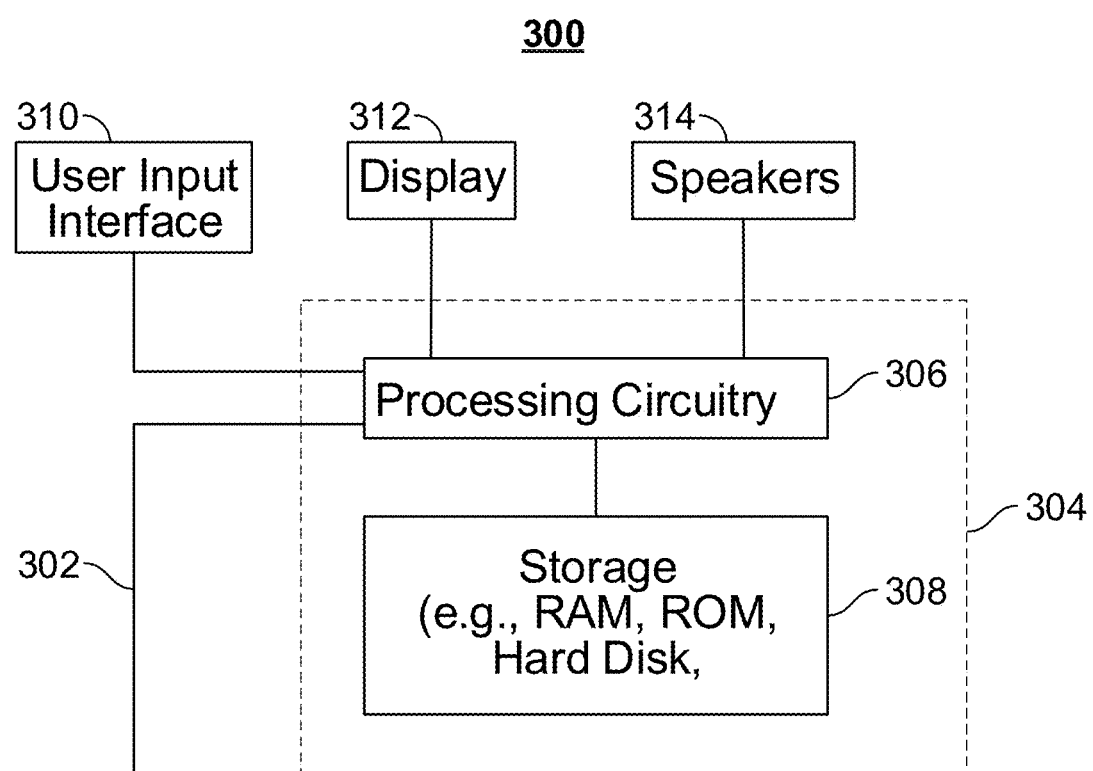
FIG. 3 is a block diagram of an illustrative user equipment device in accordance with some embodiments of the disclosure.

FIG. 3 illustrates user equipment device 200 in block diagram form. In the representation of FIG. 3, device 300, input/output 302, user input interface 310, display 312, speakers 314, control circuitry 304, processing circuitry 306, and storage 308 may correspond to embodiments of user equipment device 200, input/output path of circuit boards of set-top box 216, user interface input 210, display 212, speaker 214, circuit boards of set-top box 216, circuit boards of set-top box 216, and storage on circuit boards of set-top box 216, respectively. As shown in FIG. 3, processing circuitry 306 executes commands retrieved from storage 308, input/output path 302, and/or user input interface 310, and transmits results to display 312, 314, and/or output path 302. Such commands may include commands for receiving and determining the meaning of entered queries, initiating electronic searches to answer the queries, and presenting answer options to the user.

Figure 4:
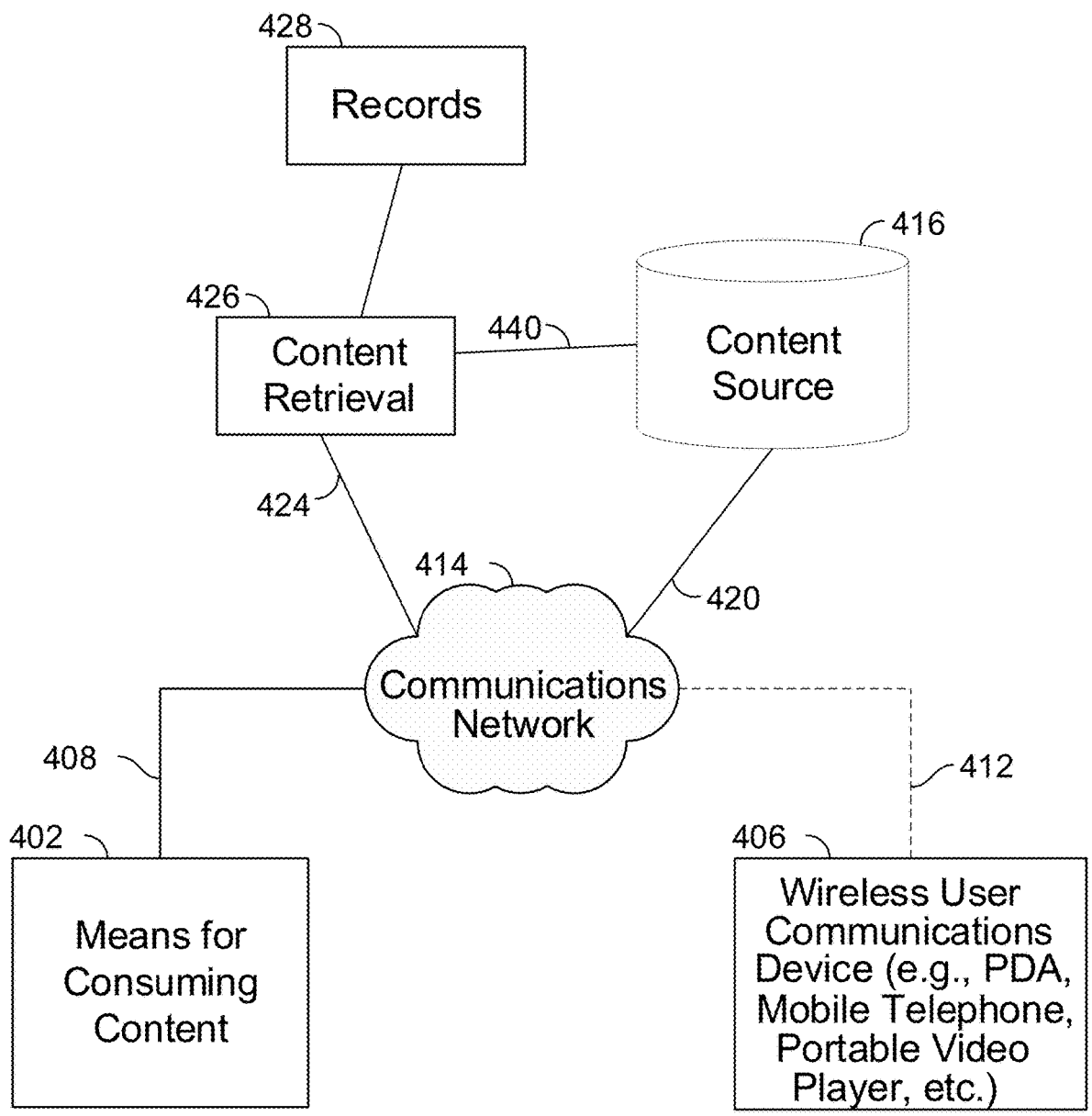
FIG. 4 is a block diagram of an illustrative system for presenting answers to content-related questions, in accordance with some embodiments of the disclosure.

Each one of user equipment device 200 and user equipment system 201 of FIG. 2 can be implemented in system 400 of FIG. 4 as means for consuming content 402, system controller 404, wireless user communications device 406, or any other type of user equipment suitable for accessing content, such as a non-portable gaming machine. For simplicity, these devices may be referred to herein collectively as user equipment or user equipment devices and may be substantially similar to user equipment devices described above. User equipment devices, on which an answer determination application may be implemented, may function as a stand-alone device or may be part of a network of devices. Various network configurations of devices may be implemented and are discussed in more detail below.

A user equipment device utilizing at least some of the system features described above in connection with FIG. 2 may not be classified solely as means for consuming content 402, system controller 404, or a wireless user communications device 406. For example, means for consuming content 402 may, like some system controller 404, be Internet-enabled allowing for access to Internet content, while system controller 404 may, like some television equipment 402, include a tuner allowing for access to television programming. The content display application or program guide may have the same layout on various different types of user equipment or may be tailored to the display capabilities of the user equipment. For example, on system controller 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

The user equipment devices may be coupled to communications network 414. Namely, means for consuming content 402 and wireless user communications device 406 are coupled to communications network 414 via communications paths 408 and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408 and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and path 408 is drawn as a solid line to it is a wired path (although these paths may be wireless paths, if desired). Communications with the user equipment devices may be provided by one or more of these communications paths but are shown as a single path in FIG. 4 to avoid overcomplicating the drawing.

Although communications paths are not drawn between user equipment devices, these devices may communicate directly with each other via communication paths, such as those described above in connection with paths 408 and 412, as well as other short-range point-to-point communication paths, such as USB cables, IEEE 1394 cables, wireless paths (e.g., Bluetooth, infrared, IEEE 402-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 coupled to communications network 414 via communication path 420. Path 420 may include any of the communication paths described above in connection with paths 408, 410, and 412. Communications with the content source 416 may be exchanged over one or more communications paths but are shown as a single path in FIG. 4 to avoid overcomplicating the drawing. In addition, there may be more than one of each of content source 416, but only one is shown in FIG. 4 to avoid overcomplicating the drawing. (The different types of each of these sources are discussed below.) If desired, content source 416 may be integrated as one source device. Although communications between source 416 and user equipment devices 402, 404, and 406 are shown as occurring through communications network 414, in some embodiments, source 416 may communicate directly with user equipment devices 402, 404, and 406 via communication paths (not shown) such as those described above in connection with paths 408 and 412. Also included is a records server 428 in electronic communication with content retrieval device 426. Records server 428 may be any computing device containing any electronic records or source of information, such as social media communications, electronic mail records, web pages, any other documents, or the like. More than one records server 428 may be present, although only one is shown in FIG. 4 for simplicity.

Content retrieval device 426 is coupled to communications network 414 via communication path 424 and coupled to content source 416 via communication path 440. Paths 424 and 440 may include any of the communication paths described above in connection with paths 408 and 412. Content retrieval device 426 may obtain or receive media content from content source 416 via communication path 440, may determine the meaning of user queries, may initiate or conduct electronic searches of content source 416 and other sources over communications network 414 to determine the answers to entered queries, and may present answer options to users via devices 402, 406.

Content source 416 may include one or more types of content distribution equipment including a television distribution facility, cable system headend, satellite distribution facility, programming sources (e.g., stored content, television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices.

Content and/or data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YouTube, Netflix, and Hulu, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide curation data described above. In addition to content and/or data, providers of OTT content can distribute curation applications (e.g., web-based applications or cloud-based applications), or the content can be displayed by curation applications stored on the user equipment device.

System 400 is intended to illustrate a number of approaches, or network configurations, by which user equipment devices and sources of content and other electronic records may communicate with each other for the purpose of accessing content and providing answers to queries. The embodiments described herein may be applied in any one or a subset of these approaches, or in a system employing other approaches for interpreting queries and delivering corresponding answers.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

Figure 5:
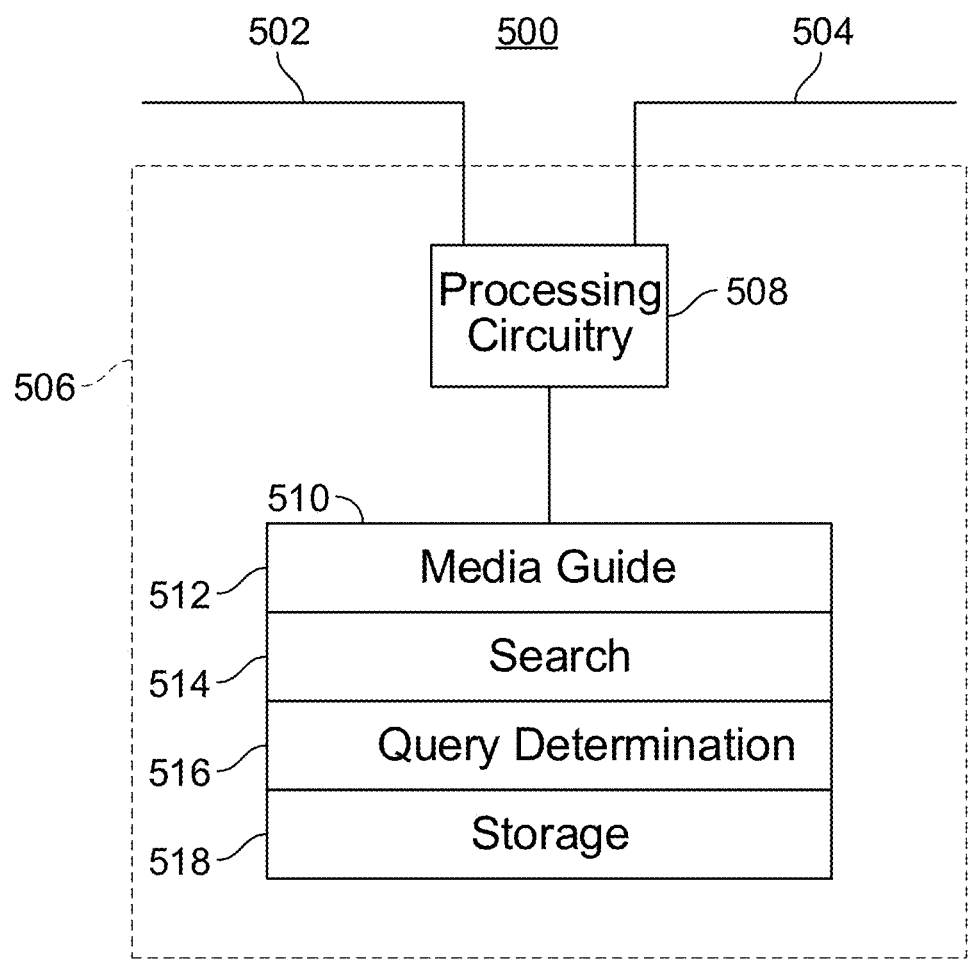
FIG. 5 is a generalized embodiment of an illustrative content retrieval server constructed for use according to embodiments of the disclosure.

FIG. 5 is a generalized embodiment of an illustrative content retrieval device or server 426 constructed for use according to embodiments of the disclosure. Here, device 500 may serve as a content retrieval device or server. Device 500 may receive content and data via I/O paths 502 and 504. I/O path 502 may provide content and data to the various user equipment devices 300, while I/O path 504 may provide data to, and receive content from, one or more content sources 416. Like the user equipment device 300, the device 500 has control circuitry 506 which includes processing circuitry 508 and storage 510. The control circuitry 506, processing circuitry 508, and storage 510 may be constructed, and may operate, in similar manner to the respective components of user equipment device 300.

Storage 510 is a memory that stores a number of programs for execution by processing circuitry 508. In particular, storage 510 may store a media guide module 512 whose execution implements a media guide or interface allowing users to select and view content, as well as enter queries and view answers to those queries. Storage 510 also stores a search module 514 for initiating or carrying out electronic searches for answers to queries entered through media guide module 512, as well as a query determination module 516 for determining the meaning of entered queries. Storage 518 is memory available for any purpose, and is available for storage of queries, keywords, spoiler records or indications thereof, content, or the like.

The device 500 may be any electronic device capable of transmitting content for display and supporting corresponding applications. For example, the device 500 may be a server, or a networked in-home smart device connected to a home modem and thereby to various devices 300. The device 500 may alternatively be a laptop computer or desktop computer configured as above.

Figure 6:
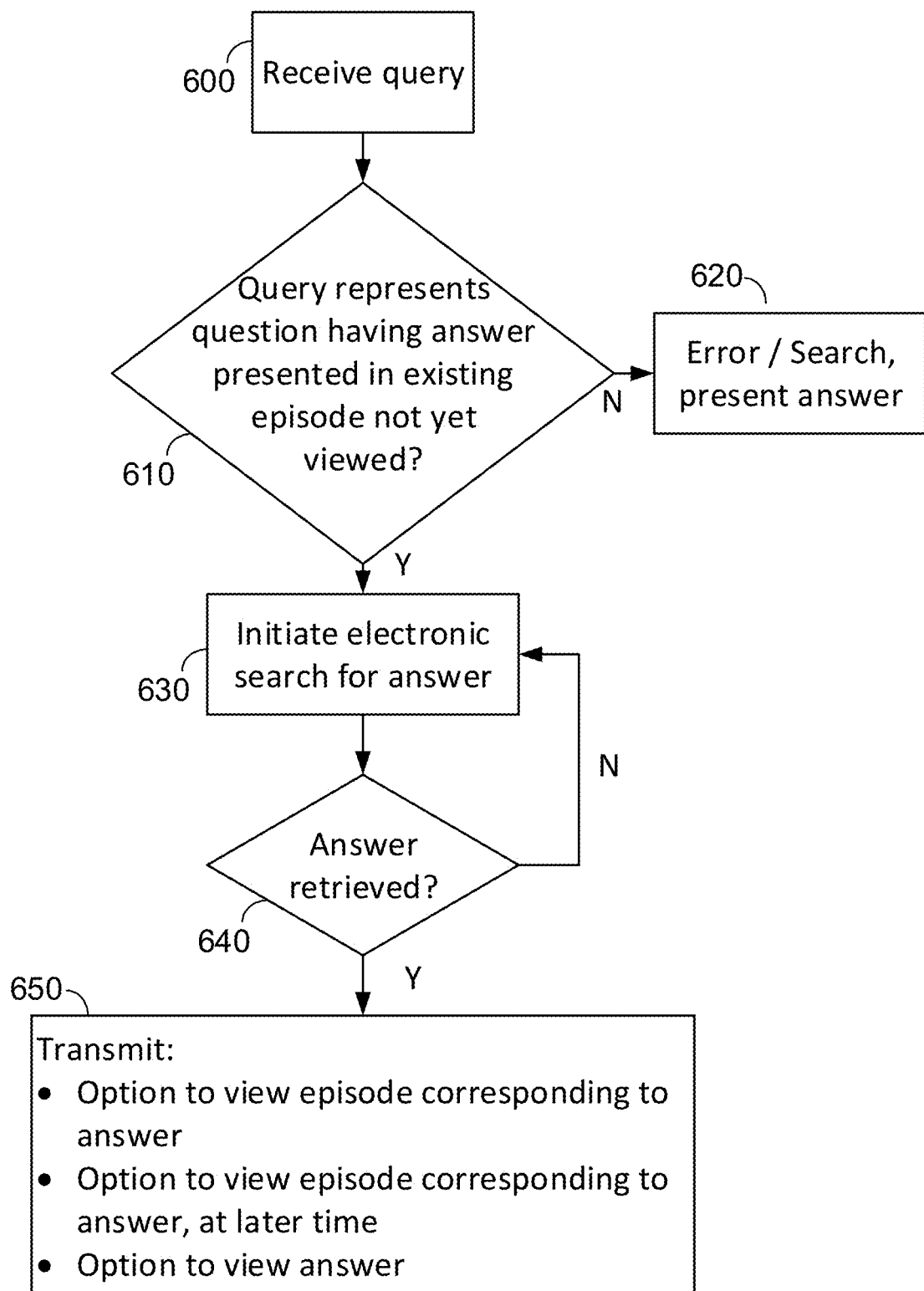
FIGS. 6-7 are flowcharts illustrating processing steps for determining and presenting answers to content-related questions, in accordance with embodiments of the disclosure.

FIG. 6 is a flowchart illustrating processing steps for determining and presenting answers to content-related questions, in accordance with embodiments of the disclosure. The process of this embodiment begins when a user enters a query regarding content, e.g., content that he or she may be viewing, or may have recently viewed. The query may be entered through media guide 512 executed on a user equipment device 300 and may be entered in any manner, such as by text characters or by voice. The query is transmitted from user equipment device 300 to content retrieval server 426, where it is received (Step 600). The query determination module 516 of content retrieval server 426 then determines whether the received query represents a question having an answer presented in an existing episode that the user has not yet viewed (Step 610). To accomplish this, query determination module 516 may first determine whether the query poses a question, and if so, then determines the meaning of the question. Each of these determinations may be carried out in any manner. For example, the first determination may be carried out by parsing the text of the query to determine its grammatical structure, by one or more machine learning methods for classifying an input query as a question, or the like. Such machine learning methods and models may include use of one or more of a random forest classifier, a support vector machine, a naïve Bayes classifier, a conditional random field classifier, a hidden Markov model, a recurrent neural network, or a convolutional neural network. The second determination may be carried out by any one or more natural language processing methods for determining the meaning of a text string. These methods may include any natural language processing or understanding method, including rule-based methods, statistical methods, and machine learning methods. Such methods are known.

If the query analyzed in Step 610 is not a question, or is determined to be a question unrelated to content, the content retrieval server 426 issues an error message indicating that no question is posed, or may search for and present the answer to the question even though it is not related to content that the system can display (Step 620). On the other hand, if the query analyzed in Step 610 is determined to be a question related to content, the search module 514 initiates an electronic search for the answer to the question (Step 630). Any type of electronic search may be performed, including Internet searches, searches of content in content source 416, or searches of any electronic records residing on any one or more records servers 428. Searches may be performed in any manner, such as by keywords extracted from the received query.

When the search of Step 630 returns results, content retrieval server 426 scans the results to determine whether an answer was retrieved (Step 640), such as by determining the natural language meaning of the text of the records, documents, web pages, or the like that correspond to the returned results. Determination of meaning may be accomplished using any of the natural language processing or understanding methods described above. If Step 640 determines that no answer was retrieved, i.e., the search did not return any record containing an answer to the question posed by the query, the process may return to Step 630 to perform another electronic search at a later time. This process may continue, with searches performed from time to time, i.e., repeatedly but not necessarily periodically, at any one or more intervals of time, until an answer is found. Searches may be repeated in any manner, such as at regular intervals, at irregular intervals, randomly, in response to certain events, or in any other manner.

If an answer is retrieved, the media guide module 514 determines, from the answer, the identity of the episode containing or revealing the answer. This may be accomplished in any manner, including parsing electronic records or content determined to contain the answer, or their metadata, to determine the date the records were created, and comparing the date to air dates of episodes of the content (as determined by, for example, associated metadata or by the text of the corresponding electronic records). Thus, for example, a large number of retrieved records (such as social media posts) each containing several keywords of the query, or each determined by natural language analysis to contain or refer to the answer, where these records were generated on the same day as an episode is aired, may be deemed to indicate that the episode aired on that day is the episode containing the answer. Similarly, metadata of each episode may be scanned to determine whether it contains the answer, such as by containing several keywords of the query, a text description of the episode that natural language analysis indicates reveals the answer, or the like.

The media guide module 514 may then transmit various options for display to the user on his or her device 300 (Step 650). Any options are contemplated. Examples include an option to immediately view the episode corresponding to the answer, an option to view the episode corresponding to the answer at a later time, and an option to view the answer itself, e.g., in text or voice form. Options may be displayed in any manner, such as in an area of a media guide screen, as a popup window, or the like, and may be selectable by the user. Selecting the option to immediately view the episode corresponding to the answer may take the user to a home page of that episode, allowing the user to select the episode for playback. Selecting the option to view the episode corresponding to the answer at a later time may allow the user to enter a date and time at which the episode will be displayed, may download the episode to the user's device 300 for viewing later, or the like. Selecting the option to view the answer itself may result in display of the answer in text form, in voice form, or in any other form desired by the user.

Figure 7:
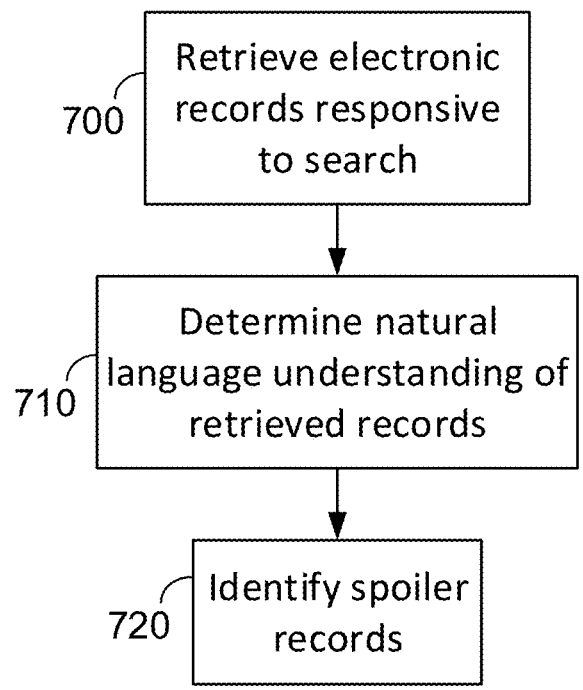

It may be assumed that users pose queries when they do not know the answer to a particular question. Accordingly, users may not wish to know the answer to their question prior to actually viewing the corresponding episode of content. Content retrieval server 426 may thus flag retrieved search results as containing potential spoilers, warning the user to avoid them to avoid learning the answer prematurely. FIG. 7 is a flowchart illustrating further details of an exemplary spoiler identification process in accordance with embodiments of the disclosure. The process steps of FIG. 7 may be performed, for example, after Step 630 of FIG. 6, although it is contemplated that performance of the steps of FIG. 7 may be carried out at any time.

The process of FIG. 7 begins when the content retrieval server 426 retrieves electronic records responsive to an electronic search (Step 700), such as in response to Step 630 of FIG. 6. The content retrieval server 426 may then determine a natural language understanding of these retrieved records (Step 710), such as by use of any natural language processing or understanding method, as described above. Those records whose natural language understandings are deemed to contain the answer to the user's query may be identified as spoiler records (Step 720), as they answer the user's question while the user is presumed not to have viewed the corresponding episode yet. Indicators of such records may be stored in storage 518, and compared to any content or records the user may view via media guide 512. Thus, for example, any content flagged as containing a spoiler may prompt the content retrieval server 426 to issue a warning to the user if the user selects the content for viewing. In this manner, users may be warned against watching not only the content episode in which the answer to their query first arises, but may also be warned against watching, for instance, other episodes of content that may happen to mention the answer.

Figure 8:
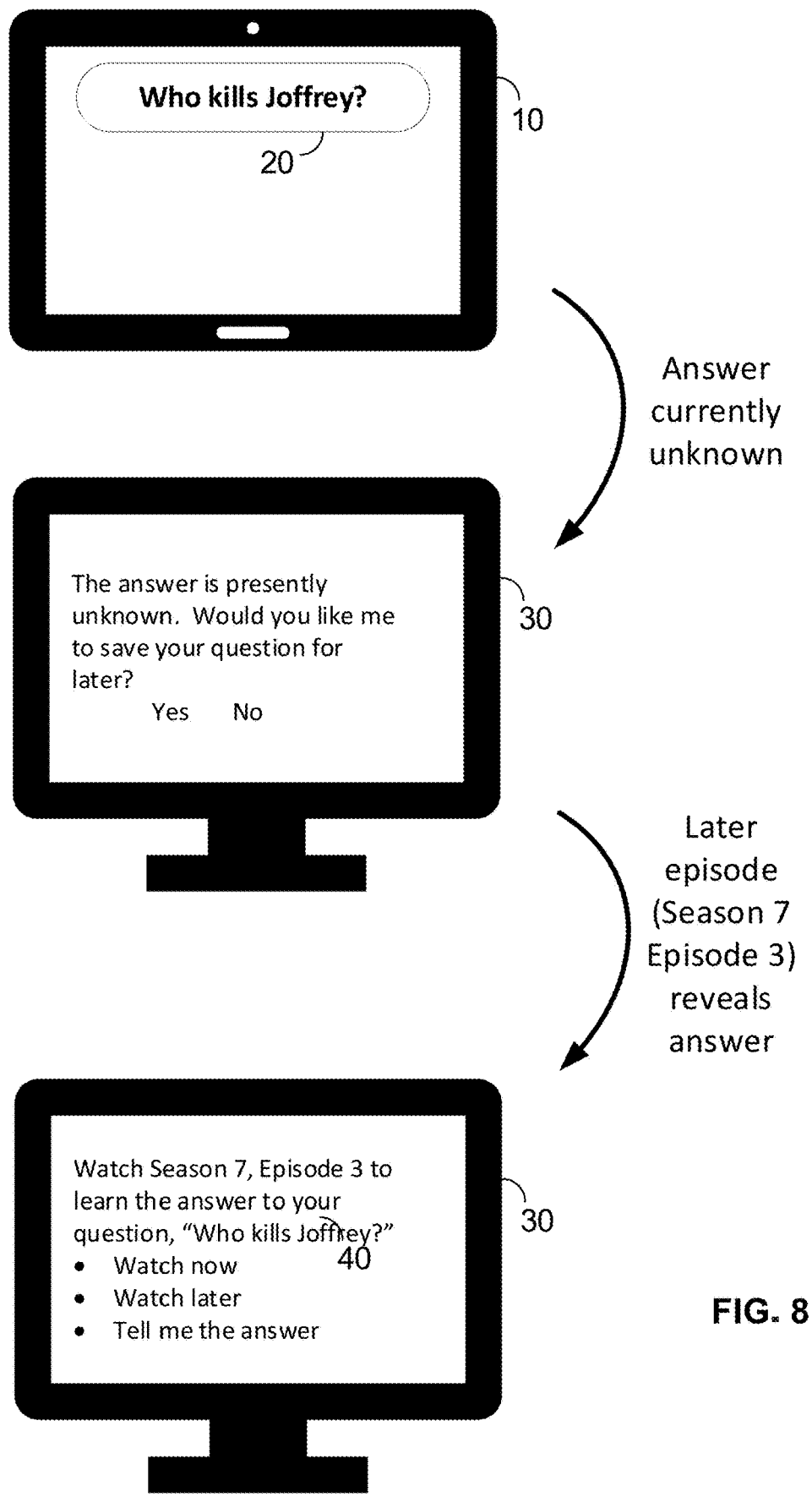
FIGS. 8-10 illustrates exemplary processing steps for determining and presenting answers to content-related questions, in accordance with further embodiments of the disclosure.

FIG. 8 illustrates exemplary processing steps for determining and presenting answers to content-related questions, in accordance with further embodiments of the disclosure. In certain embodiments of the disclosure, users may be caught up to a series of content, i.e., they may be currently watching the latest episode, and may have questions that the series has not yet answered. For example, the user may suspect that a currently-alive character will die soon, or may have heard rumors to that effect, or may be under the mistaken belief that the character has died. The user may thus enter a query into electronic interface 20 asking who killed the character. The content retrieval server 426 determines that no answer yet exists, as above by conducting an electronic search with no satisfactory results, or by retrieving results whose natural language interpretations indicate that the character is still alive. As a result, the content retrieval server 426 sends a message for display to the user, indicating that the answer to their question is presently unknown. The content retrieval server 426 may also optionally ask the user whether he or she would like their question saved for later, i.e., saved for continued searching in case the answer appears at a later time. If the user elects to save their question, the content retrieval server 426 searches repeatedly for the answer as above. When the answer is found, the content retrieval server 426 displays options for revealing the answer, such as an option to watch the corresponding episode immediately, to watch the corresponding episode at some later time, or to view the answer directly.

Figure 9:
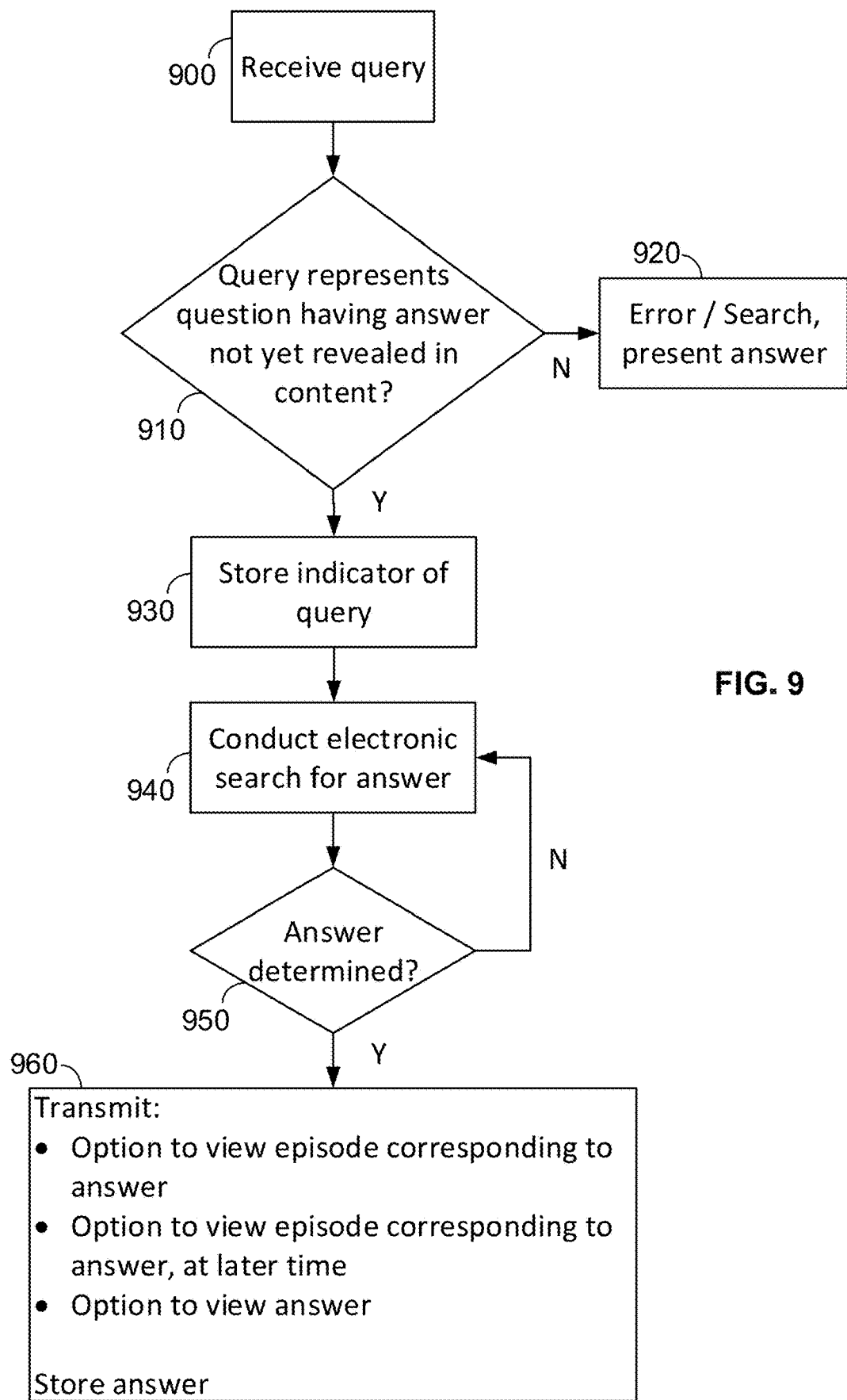

In similar manner to that of FIG. 6, the process of FIG. 9 begins when a user enters a query regarding content, e.g., content that he or she may be viewing, or may have recently viewed. The query may be entered through media guide 512 executed on a user equipment device 300 and may be entered in any manner, such as by text characters or by voice. The query is transmitted from user equipment device 300 to content retrieval server 426, where it is received (Step 900). The query determination module 516 of content retrieval server 426 then determines whether the received query represents a question having an answer not yet revealed in the content (Step 910). To accomplish this, query determination module 516 may first determine whether the query poses a question, and if so, then determines the meaning of the question. Each of these determinations may be carried out as described above in connection with Step 610. For example, the first determination may be carried out by parsing the text of the query to determine its grammatical structure, by one or more machine learning methods for classifying an input query as a question, or the like. Such machine learning methods and models may include use of one or more of a random forest classifier, a support vector machine, a naïve Bayes classifier, a conditional random field classifier, a hidden Markov model, a recurrent neural network, or a convolutional neural network. The second determination may be carried out by any one or more natural language processing methods for determining the meaning of a text string. These methods may include any natural language processing or understanding method, including rule-based methods, statistical methods, and machine learning methods. Such methods are known.

If the query analyzed in Step 910 is not a question, or is determined to be a question unrelated to content, the content retrieval server 426 issues an error message indicating that no question is posed, or may search for and present the answer to the question even though it is not related to content that the system can display (Step 920). On the other hand, if the query analyzed in Step 910 is determined to be a question related to content, the content retrieval server 426 stores the query or some indicator thereof that represents the query (Step 930), and conducts an electronic search for the answer (Step 940). Recall that, at the time of the query, no answer exists yet, i.e., the content has not presented an answer to the user's question. Accordingly, while search module 514 initiates an electronic search for the answer to the question, initially no answer is found. A check for whether an answer has been determined (Step 950) thus initially results in a negative result, and the process returns to Step 940. Searches continue from time to time, e.g., at any one or more intervals, periodically or otherwise. Any type of electronic search may be performed, including Internet searches, searches of content in content source 416, or searches of any electronic records residing on any one or more records servers 428. Searches may be perforated in any manner, such as by keywords extracted from the received query. The meaning of returned results may be determined using any of the natural language processing or understanding methods described above.

When the search of Step 940 does return a positive result, i.e., a new episode of content eventually reveals the answer and this revelation is detected in search results, the media guide module 514 determines the identity of the episode containing or revealing the answer. This may be accomplished in any of the ways described above in connection with Step 650. The media guide module 514 may then transmit various options for display to the user on his or her device 300 (Step 960). Any options are contemplated. Examples include an option to immediately view the episode corresponding to the answer, an option to view the episode corresponding to the answer at a later time, and an option to view the answer itself, e.g., in text or voice form. Options may be displayed in any manner, such as in an area of a media guide screen, as a popup window, or the like, and may be selectable by the user.

Figure 10:
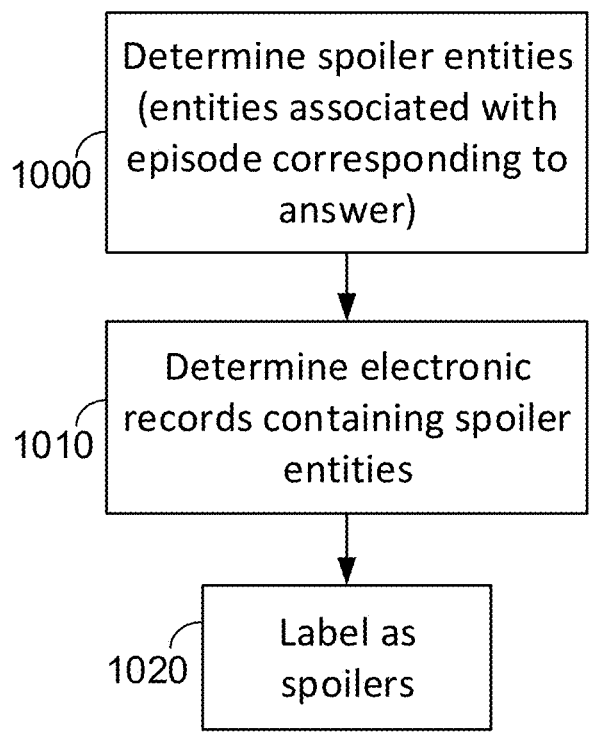

The user may wish to avoid learning the answer to his or her question prior to watching the corresponding episode of content. That is, users may wish to avoid spoilers before they view the answer for themselves. FIG. 7, described above, illustrates one illustrative process for identifying spoiler records. Embodiments of the disclosure encompass other spoiler identification processes, however. FIG. 10 is a flowchart illustrating process steps for identifying spoiler records in accordance with a further embodiment of the disclosure. The process steps of FIG. 10 may be performed, for example, after Step 950 of FIG. 9, although it is contemplated that performance of the steps of FIG. 10 may be carried out at any time.

Once the content retrieval server 426 finds the answer to the user's question, such as in Step 950 of FIG. 9, the content retrieval server 426 may then determine spoiler entities, or entities associated with the answer to the query (Step 1000). The information stored at Step 930 may contain the keywords used or otherwise indicated by the query. Spoiler entities may thus be any of these stored keywords. For example, spoiler entities may be any of the characters or other entities listed in the user's query, such as the name of the character killed, the name of the killer, or the like. Additional spoiler entities besides simply those listed in query keywords may also be identified in any manner, such as by use of a graph of terms corresponding to a particular series of content, other keywords commonly arising in returned search results, and the like. Embodiments of the disclosure contemplate determination of spoiler entities in any manner.

The content retrieval server 426 then determines those electronic records containing spoiler entities (Step 1010). That is, for the electronic search identifying the answer to the user's question, those search results containing spoilers are identified. Results may be identified as containing spoilers according to any metric, e.g., results may be identified as containing spoilers if they contain any spoiler entity, more than one spoiler entity, every spoiler entity, a determined natural language interpretation corresponding to the answer, or the like. Those results identified as containing spoilers are then labeled or flagged as spoilers (Step 1020), whereupon the content retrieval server 426 may take any appropriate action. For example, any content flagged as containing a spoiler may prompt the content retrieval server 426 to issue a warning to the user if the user selects the content for viewing. In this manner, users may be warned against watching not only the content episode in which the answer to their query first arises, but may also be warned against watching, for instance, episodes of unrelated content that may happen to mention the answer, or viewing any records such as social media posts that reveal the answer.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, search queries may be determined to be questions, and their natural language meanings may be determined, in any manner. Additionally, any electronic records may be searched, such as social media posts, documents, web pages, and the like. Spoiler entities may be determined in any manner, whether by query keyword, determination of any entities related to those keywords, or in any other manner. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method comprising:
generating first content for output on a device associated with a user profile;
receiving a natural language input;
analyzing the input to determine that the input includes a question about the first content;
determining that an answer to the question is included in second content, wherein the user profile indicates that the second content was not consumed; and
generating for display a user selectable option for learning the answer based on determining that the answer to the question is included in the second content that was not consumed.

2. The method of claim 1, wherein the user selectable option includes at least one of an option to view the second content, an option to view the second content at a later time, or an option to view the answer.

3. The method of claim 1, wherein the user profile indicates that the second content was not consumed, the method comprising:
generating for display a user selectable option for presenting a responsive content item based on determining that the answer to the question is included in the second content that was not consumed.

4. The method of claim 3, wherein the user selectable options for presenting the responsive content item includes at least one of a first user selectable option to generate for display the responsive content item, a second user selectable option to generate for display the responsive content item at a later time, or a third user selectable option to generate for display the answer.

5. The method of claim 1, comprising:
searching all accessible content sources to determine whether a content source includes the answer to the question, wherein the second content is not sourced from the content source; and
in response to determining that a search of all accessible content sources does not include the answer to the question, generating for display a message indicating that the answer to the question is unknown.

6. The method of claim 1, comprising:
searching all accessible content sources to determine whether a content source includes the answer to the question, wherein the second content is not sourced from the content source; and
in response to determining that a search of all accessible content sources does not include the answer to the question, generating for display a user selectable option to save the question for a later time.

7. The method of claim 1, comprising generating for display a warning based on determining that the answer to the question is included in the second content that was not consumed.

8. The method of claim 7, wherein the warning includes a warning against watching the second content item.

9. The method of claim 7, wherein the warning includes a warning against watching other content items that include the answer.

10. The method of claim 1, wherein the generating for display the user selectable option comprises generating for simultaneous display: (a) a first user selectable option to generate for display the second content, (b) a second user selectable option to generate for display the second content at a later time, and (c) a third user selectable option to generate for display the answer.

11. A system comprising:
circuitry configured to:
generate first content for output on a device associated with a user profile;
receive a natural language input;
analyze the input to determine that the input includes a question about the first content;
determine that an answer to the question is included in second content, wherein the user profile indicates that the second content was not consumed; and
generate for display a user selectable option for learning the answer based on determining that the answer to the question is included in the second content that was not consumed.

12. The system of claim 11, wherein the user selectable option includes at least one of an option to view the second content, an option to view the second content at a later time, or an option to view the answer.

13. The system of claim 11, wherein the user profile indicates that the second content was not consumed, and wherein the circuitry is configured to:
generate for display a user selectable option for presenting a responsive content item based on determining that the answer to the question is included in the second content that was not consumed.

14. The system of claim 13, wherein the user selectable options for presenting the responsive content item includes at least one of a first user selectable option to generate for display the responsive content item, a second user selectable option to generate for display the responsive content item at a later time, or a third user selectable option to generate for display the answer.

15. The system of claim 11, wherein the circuitry is configured to:
search all accessible content sources to determine whether a content source includes the answer to the question, wherein the second content is not sourced from the content source; and
in response to determining that a search of all accessible content sources does not include the answer to the question, generate for display a message indicating that the answer to the question is unknown.

16. The system of claim 11, wherein the circuitry is configured to:
search all accessible content sources to determine whether a content source includes the answer to the question, wherein the second content is not sourced from the content source; and
in response to determining that a search of all accessible content sources does not include the answer to the question, generate for display a user selectable option to save the question for a later time.

17. The system of claim 11, wherein the circuitry is configured to generate for display a warning based on determining that the answer to the question is included in the second content that was not consumed.

18. The system of claim 17, wherein the warning includes a warning against watching the second content item.

19. The system of claim 17, wherein the warning includes a warning against watching other content items that include the answer.

20. The system of claim 11, wherein the circuitry is further configured to generate for display the user selectable option by generating for simultaneous display: (a) a first user selectable option to generate for display the second content, (b) a second user selectable option to generate for display the second content at a later time, and (c) a third user selectable option to generate for display the answer.

* * * * *